United States Patent [19]

Norøy

[11] 4,392,274

[45] Jul. 12, 1983

[54] APPARATUS FOR PULLING-OFF THE SKIN OF SHEEP CARCASSES IN SLAUGHTERING

[76] Inventor: Terje Norøy, Tronerudveien 17, N-3550 Gol, Norway

[21] Appl. No.: 247,531

[22] PCT Filed: Jul. 4, 1980

[86] PCT No.: PCT/NO80/00022

§ 371 Date: Mar. 3, 1981

§ 102(e) Date: Mar. 3, 1981

[87] PCT Pub. No.: WO81/00040

PCT Pub. Date: Jan. 22, 1981

[30] Foreign Application Priority Data

Jul. 6, 1979 [NO] Norway .................................. 792255

[51] Int. Cl.³ ............................................. A22B 5/16
[52] U.S. Cl. ............................................... 17/21
[58] Field of Search .................................. 17/21, 50

[56] References Cited

U.S. PATENT DOCUMENTS

| | | | |
|---|---|---|---|
| 3,545,037 | 12/1970 | Anderson | 17/21 |
| 3,930,284 | 1/1976 | Cook | 17/50 |
| 4,021,883 | 5/1977 | Schmidt, Jr. | 17/21 |
| 4,127,917 | 5/1978 | Pohio et al. | 17/21 |
| 4,164,056 | 8/1979 | Hilgner et al. | 17/21 |
| 4,229,860 | 10/1980 | Irwin | 17/21 X |

*Primary Examiner*—Willie G. Abercrombie
*Attorney, Agent, or Firm*—Scully, Scott, Murphy and Presser

[57] ABSTRACT

An apparatus for pulling-off the skin of sheep carcasses in connection with slaughtering comprises an essentially horizontal drum (8) for pulling-off the skin during winding thereof on the drum (8), the drum (8) being moved upwards along the dorsal side of a sheep carcass (31) suspended from the hind legs. The drum (8) has a gradually increasing diameter from a central portion towards both ends, and is mounted at the free end of a pivotable lifting beam (3) having a means (I) for upwards directed pivoting movement of the beam during the pulling operation. A motor means provides for rotation of the drum (8) synchronously with the pivoting movement of the lifting beam (3) and with a speed which is adapted to the movement of the lifting beam.

8 Claims, 5 Drawing Figures

APPARATUS FOR PULLING-OFF THE SKIN OF SHEEP CARCASSES IN SLAUGHTERING

The present invention relates to an apparatus for pulling-off the skin of sheep carcasses in connection with slaughtering, comprising an essentially horizontal drum which is arranged to pull off the skin during winding thereof on the drum, the drum being moved upwards along the dorsal side of a sheep carcass suspended from the hind legs.

In connection with slaughtering of big cattle there are known devices for hide pulling wherein a drum is arranged to pull off the hide during simultaneous winding thereof on the drum. However, the known devices are not practically usable for pulling-off of skins in sheep slaughtering, as they do not provide for the necessary and appropriate distribution of the pressure on the skin and the sheep carcass around the whole carcass, with the result that the carcass cracks on exposed places, and the membrane which is to remain on the carcass is pulled off together with the skin.

The object of the invention is to provide an apparatus for pulling-off skins of sheep and lamb carcasses by which there is achieved a rational and effective skin pulling, and wherein the drum is especially shaped in order to achieve reduced working effort in flaying and simultaneously ensure gentle skin pulling without damage of the carcass.

The above-mentioned object is achieved with an apparatus of the type set forth above, which, according to the invention, is characterized in that the drum has a gradually increasing diameter from a central portion towards both ends, and is mounted at the free end of a pivotable lifting beam which is provided with a means for upwards directed pivoting movement of the beam during the pulling operation, and that there is provided a means for rotation of the drum synchronously with the pivoting movement of the lifting beam and with a speed which is adapted to the movement of the lifting beam.

The invention will be more closely described below in connection with an exemplary embodiment with reference to the accompanying drawings, wherein FIG. 1 shows a side view of a schematically shown skin puller apparatus according to the invention;

Figure 4:
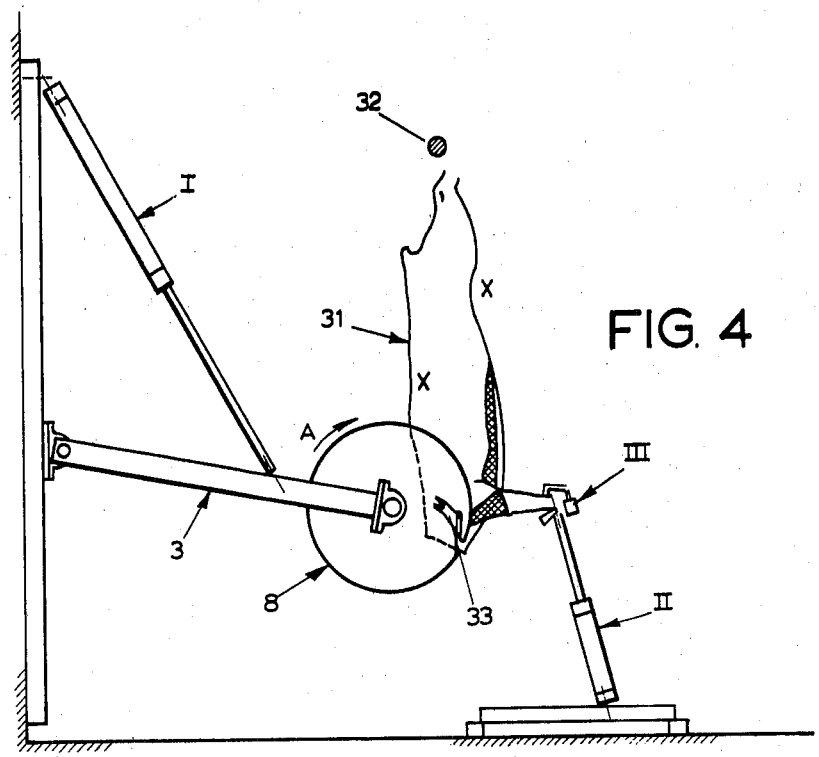
Figure 5:
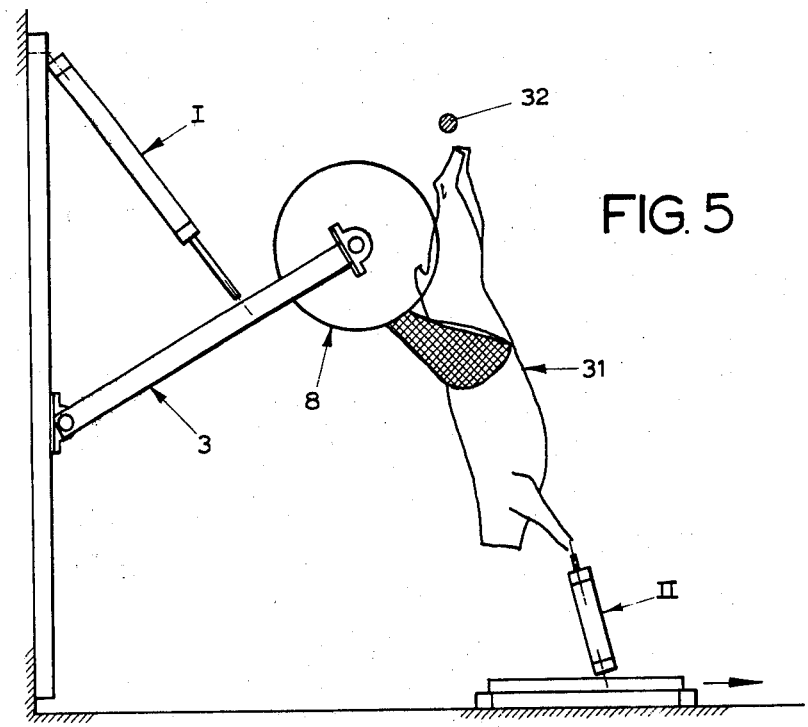

FIG. 4 and 5 schematically illustrate two different operational phases during a skin pulling-off operation.

Figure 1:
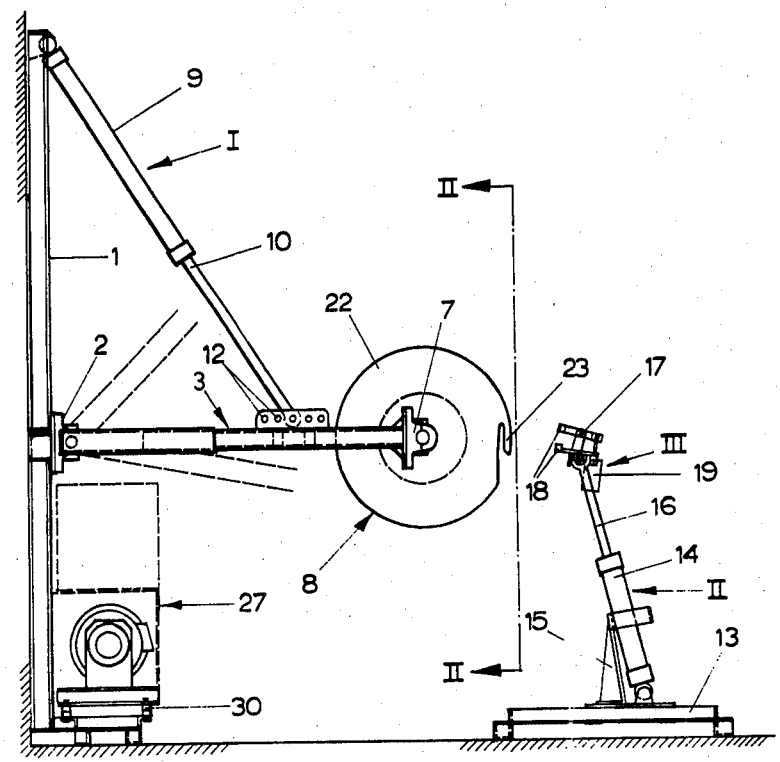
Figure 3:
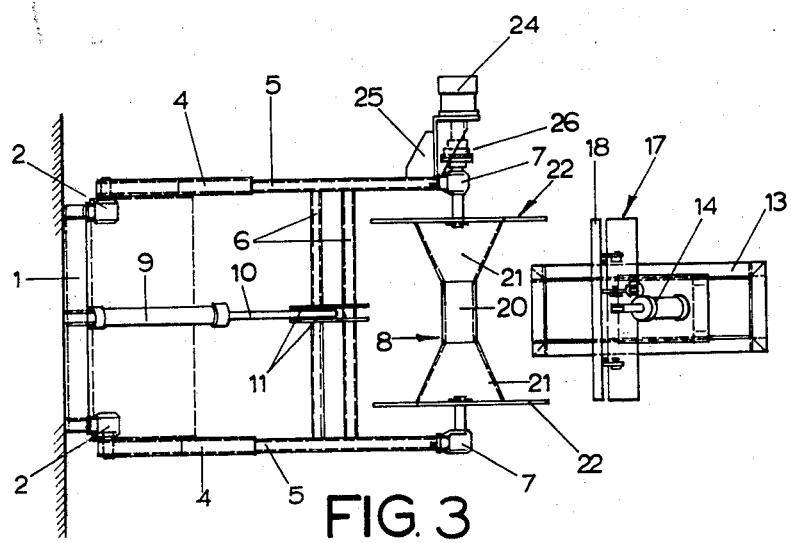
FIG. 3 shows a top view of the apparatus in FIG. 1.
Figure 2:
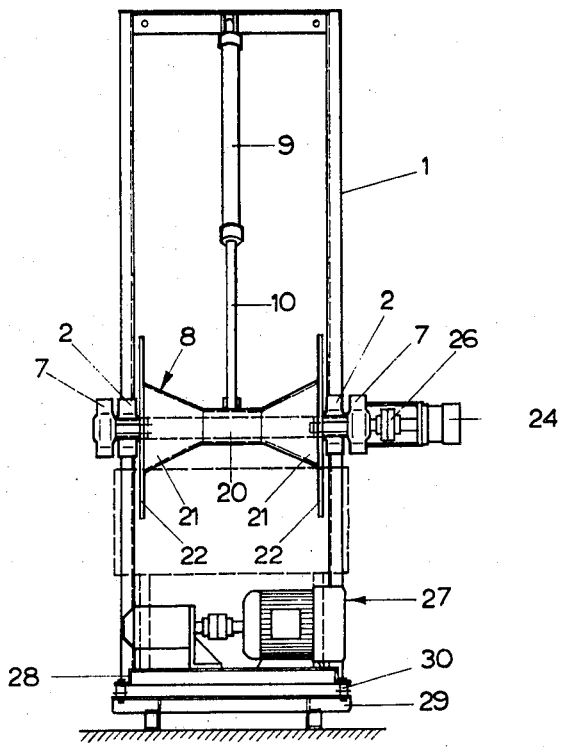
FIG. 2 shows a front view along the line II—II in FIG. 1.

As shown in FIGS. 1-3, the skin puller apparatus in the illustrated embodiment comprises a vertically disposed, rectangular steel frame 1 having vertical side members carrying suitable bearing means 2 for pivotal mounting of one end of a lifting beam means 3. The bearing means 2 may be displaceably mounted on the side members of the frame. The lifting beam means 3 comprises a pair of e.g. telescopically extendable tube and rod members 4 and 5 and a pair of bracing members 6 extending therebetween. On the free ends of the rod members 5 there are mounted bearings 7 for the support of an essentially horizontal drum 8 which is to be described below. The lifting beam means with the drum is pivotable upwards and downwards by means of an operating means which in the illustrated embodiment comprises a hydraulic cylinder and piston unit 9 (cylinder I). At its upper end the hydraulic cylinder 9 is pivotally connected to an upper cross member of the frame 1, whereas the lower free end of the piston rod 10 is pivotally mounted between a pair of holding plates 11 attached on the bracing members 6 and provided with a plurality of apertures 12 or the like for adjustable mounting of the piston rod end.

On the subgrade, at a suitable distance in front of the lifting beam means 3, there is provided a clamping means with a combined holding and stretching funtion which is to be described more closely below in connection with the use of the apparatus. In the illustrated embodiment the clamping means comprises a supporting frame 13 for the support of a hydraulic cylinder/piston unit 14 (cylinder II). At its lower end the hydraulic cylinder is pivotally connected to the supporting frame 13, and by means of a supporting means 15 the cylinder is supported in an oblique position as shown in FIG. 1. On the upper end of the piston rod 16 of the cylinder/piston unit 14 there is mounted a gripping head means 17 with gripping jaws 18 which are operable by means of a hydraulic cylinder/piston unit 19 (cylinder III).

In the shown embodiment the drum 8 comprises a central cylindrical portion 20 which at each end merges into a portion 21 having a gradually increasing diameter in the direction towards the ends of the drum, and e.g. having a conical shape. On each drum end there is provided an essentially circular end plate 22 having a larger diameter than that of the outer ends of the drum 8 and being provided with a hook portion 23 which in the illustrated example is formed by an essentially tangentially extending notch in the end plate in question. The importance of the concave or saddle-like drum shape is to be described more closely below in connection with the operation of the apparatus.

For rotation of the drum 8 a motor 24, which e.g. may be of hydraulic type, is provided at the free end of one of the lifting beam rod members 5. The motor is supported by a bracket means 25 attached to the rod member 5, and is connected to the shaft of the drum 8 through a suitable clutch 26.

For the operation of the described operating and driving means which are included in the shown embodiment of the apparatus according to the invention, there is provided a hydraulic unit 27 which, at the base of the vertical steel frame 1, is supported by a base plate 28 which is in turn supported on a frame 29 through buffers 30.

The various hydraulic and/or electric supply conduits, and the various connections and control means, such as control valves and the like, which are necessary for operation and control of the apparatus, are not illustrated in the schematic drawing figures. The arrangement of these means is of technical kind and therefore is not more closely shown and described, as a person skilled in the art will realize the necessary arrangement in view of the following description of the operation of the apparatus. Similarly, it will be seen that the apparatus may possibly be adapted for pneumatic instead of hydraulic operation.

In the following a skin pulling-off operation will be described with reference to FIGS. 4 and 5.

When a sheep carcass arrives at the skin puller apparatus, it has been flayed from the breast and just beyond the navel. The skin is cut from knee joint to knee joint at the front edge of the breast. The forelegs have been cut off at the knee joint, but the metatarsal bones stick to the skin.

The initial or zero position of the apparatus is shown in FIG. 4. The sheep or lamb carcass 31 is suspended from the hind legs in connection with a suggested overhead conveyor 32. Further, the sheep carcass is clamped in that the ends of the "antibrachial bones" (i.e. the forelegs above the knee joint) are introduced into and clamped between the gripping jaws 18 of the clamping means, the cylinder III being activated for this purpose. As mentioned, the metatarsal bones 33 stick to the skin and are introduced in the notches of the drum end plates 22 and thus secured by means of the hooks 23 at each end of the drum.

The drum and the lifting beam now start automatically and synchronously, and the drive motor 24 rotates the drum 8 in the direction of the arrow A in FIG. 4 at the same time as the cylinder I gets instruction for upwards directed stroke movement with a set, reduced speed, so that one achieves the correct angle for the pulling-off of the skin across the shoulder portion of the carcass, the skin now being wound onto the drum (in FIGS. 4 and 5 the inner side of the skin is marked with a hatched area). As shown in FIG. 4, the movement of the lifting beam 3 is started from a somewhat lowered position in relation to the horizontal, and the synchronized movement of the lifting beam and the drum is adjusted so that one achieves the particular and intended pulling angle resulting in optimum skin pulling.

When the drum has been raised a suitable distance (normally about 20 cm), cylinder I gets instruction or order to continue its stroke, but now with full speed, at the same time as cylinder II gets order for stroke, i.e. downward movement of the piston rod 16 with the clamping means. The antibrachial bones and therewith the sheep carcass are thereby stretched obliquely downwards and outwards from the lifting beam and the drum, such as it appears from FIG. 5 (the carcass is normally pulled somewhat more outwards from the drum than shown in the Figure). Thus, the skin is pulled off from the back at an angle of ca. 25°–30°.

The special configuration of the drum results in that the pressure on the skin and the sides and back of the carcass is equalized and distributed around the carcass itself, so that it does not crack. The flank and the rearward part of the back (marked with x in FIG. 4) are critical points in the use of a skin puller, and without the special shape of the drum, the flank would crack and the membrane on the leg would be pulled off together with the skin.

By use of e.g. a straight drum it would be necessary with substantially more preparatory work during the slaughtering as the flank and the sides would then have to be flayed by hand. With the present skin puller, however, the sheep carcass is flayed approximately 10 cm on each side from the breast and just beyond the navel, so that the preparatory work may be made much simpler. There will be less flaying, so that the second-class percentage of the skins becomes smaller. Less flaying further involves that the slaughtering may be carried out more hygienically and less laboriously.

When the lifting beam is at the top and the skin has been pulled off the carcass, the metatarsal bones are cut off from the skin by means of a pair of knives (not shown) arranged in connection with the overhead conveyor. Thereafter the lifting beam returns to its initial position at the same time as the drum is rotated in the direction opposite to the winding direction, so that the skin falls down from the drum and the apparatus thus is ready for another working cycle.

Instead of the shown clamping means with gripping head means with hydraulically operated gripping jaws, the clamping means may simply consist of a suitable hook means onto which the forelegs of the sheep carcass may be hooked. A number of such hook means may be provided at different heights along a rod which is pivotally mounted and fixable in a desired position on a supporting frame, so that one achieves adaption for clamping of carcasses of different sizes, and simultaneously, by pivoting of the rod, may pull the carcass outwards from the drum to the most suitable position for pulling-off of the skin.

I claim:

1. An apparatus for pulling-off the skin of sheep, lamb or similar carcasses in connection with slaughtering, comprising an essentially horizontal drum which is arranged to pull off the skin during winding thereof on the drum, the drum being moved along the dorsal side of a vertically suspended carcass characterized in that the drum (8) has a gradually increasing diameter from the central portion (20) towards both ends and a clamping means to affix the skin to the drum at the beginning of the cycle, said drum being mounted at the free end of a pivotable beam (3) which is provided with a means (9) for pivoting movement of the beam during the pulling-off operation, along and in engagement with the dorsal side of said carcass and that there is provided a means (24) for rotation of the drum (8), said drum (8) being rotated synchronously with the pivoting movement of the beam (3) and with a speed which is adapted to the pivoting movement of the beam traversing said dorsal side of said carcass whereby varying amounts of force at varying angles are exerted on the skin responsive to the locus of the drum along the carcass, to most effectively and uniformly carry out the skin removal process with minimal damage to the skin.

2. An apparatus according to claim 1 characterized in that the carcass is suspended from the hind legs, and the apparatus comprises means (17–19) for clamping of the forelegs of a carcass (31), and which is arranged to stretch the forelegs, obliquely away from the beam (3) and the drum (8) after the beam (3) has been moved a predetermined distance.

3. An apparatus according to claim 2, characterized in that the drum is moved upwards during the skin pulling and the means (9) for pivoting movement of the beam (3) is arranged to lift the beam from an initial position with a first lower speed, which is adapted to the rotational speed of the drum (8), and thereafter with a higher speed.

4. An apparatus according to claim 1, characterized in that the drum (8) comprises essentially circular end plates (22) having a substantially larger diameter than the end portions (21) of the drum, and being provided with respective hook means (23) at corresponding places at the periphery of the end plates (22).

5. An apparatus according to claim 1 or 2 or 4, characterized in that the movement means comprises a hydraulic cylinder/piston unit (9).

6. An apparatus according to claim 2, characterized in that the clamping means (17–19) is mounted on the upper end of a piston rod (16) forming part of a hydraulic cylinder/piston unit (14).

7. An apparatus according to claim 2, characterized in that the clamping means (17–19) comprises gripping jaw elements (18) arranged to be actuated by a hydraulic cylinder/piston unit (19).

8. An apparatus according to claim 2, characterized in that the drum (8) is driven by a motor (24) which is arranged to rotate the drum (8) back to its initial position during a return movement of the beam (3) to the initial position thereof.

* * * * *